United States Patent [19]

Karellas

[11] Patent Number: 5,572,034
[45] Date of Patent: Nov. 5, 1996

[54] FIBER OPTIC PLATES FOR GENERATING SEAMLESS IMAGES

[75] Inventor: Andrew Karellas, Auburn, Mass.

[73] Assignee: University of Massachusetts Medical Center, Worcester, Mass.

[21] Appl. No.: 486,406

[22] Filed: Jun. 7, 1995

Related U.S. Application Data

[63] Continuation-in-part of Ser. No. 287,239, Aug. 8, 1994, Pat. No. 5,519,227.

[51] Int. Cl.⁶ .............................. G01T 1/20; H01L 25/00
[52] U.S. Cl. .................... 250/368; 250/367; 250/370.09; 385/115
[58] Field of Search .................................. 250/368, 367, 250/370.08, 370.09; 378/62; 385/115

[56] References Cited

U.S. PATENT DOCUMENTS

| | | |
|---|---|---|
| 4,394,737 | 7/1983 | Komaki et al. . |
| 4,739,399 | 4/1988 | Swann et al. . |
| 4,755,681 | 7/1988 | Oka et al. ............................ 250/367 |
| 4,969,043 | 11/1990 | Pothier . |
| 5,081,346 | 1/1992 | Narabu et al. ...................... 250/227.2 |
| 5,129,028 | 7/1992 | Soltan . |
| 5,138,166 | 8/1992 | Makino et al. ..................... 250/368 |
| 5,138,642 | 8/1992 | McCroskey et al. . |
| 5,150,394 | 9/1992 | Karellas . |
| 5,259,057 | 11/1993 | Cook . |
| 5,308,986 | 5/1994 | Walker . |
| 5,391,879 | 2/1995 | Tran et al. ........................... 250/367 |

FOREIGN PATENT DOCUMENTS 58-210582 12/1983 Japan ................................... 250/368

OTHER PUBLICATIONS

Abileah, "Optical Tile Active Matrix LCD for Seamless Large Displays", Advanced Imaging pp. 20, 22, & 68 Jan., 1993.

Karellas et al., "Imaging of Radionuclide Emissions with a Low–Noise Charge–Coupled Device", IEEE Transactions on Nuclear Science 40:979–982, 1993.

*Primary Examiner*—Carolyn E. Fields
*Assistant Examiner*—Virgil O. Tyler
*Attorney, Agent, or Firm*—Fish & Richardson P.C.

[57] ABSTRACT

An optical imaging system for generating a seamless image during, for example, X-ray imaging procedures. The imaging system features at least two optical detectors, each including an optically active region for generating separate light-induced images, and a fiber optic plate separated by a groove into first and second fiber-containing sections. Each of the first and second sections are connected to a separate optical detector so that, during operation, fibers contained in these sections function to deliver light exclusively to the optically active regions of the connected detectors, thereby allowing generation of separate light-induced images. These images can then be combined to form a seamless image.

30 Claims, 8 Drawing Sheets

FIBER OPTIC PLATES FOR GENERATING SEAMLESS IMAGES

BACKGROUND

This application is a continuation-in-part of U.S. Ser. No. 08/287,239, entitled "Structured Scintillation Screen", filed Aug. 8, 1994, now U.S. Pat. No. 5,519,227, issued May 21, 1996.

This invention relates to fiber optic plates used in image generation.

Fiber optic plates feature two-dimensional matrices of optical fibers fused together in a side-by-side fashion. Typically, such plates are used to channel optical fields having areas which are large relative to the aperture of a single fiber to radiation detectors. For example, fiber optic plates are used in X-ray imaging, where they optically couple scintillators, which emit optical radiation following X-ray exposure, and light-sensitive charge-coupled devices (CCDs). In this application, each fiber in the fiber optic plate collects and then channels radiation emitted by a portion of the scintillator to a small region on the CCD. Each fiber is optically isolated and acts as a waveguide. Thus, effects which normally degrade image resolution, such as spatial dispersion and scattering of the optical radiation, are reduced. Detection of each optical field delivered by the fibers, followed by a processing step, is used to form an image.

Examples of fiber optic plates contained in scintillating screens are taught in Ito et al., IEEE Trans. Nuc. Sci., Vol. 34, p. 401; this reference describes a two-dimensional phosphor screen consisting of individual CsI(Na) crystals grown on glass fibers etched onto a glass plate. Tran et al., U.S. Pat. No. 5,302,423, describes a method for fabricating pixelized phosphors using optical ablation techniques.

Multiple imaging systems containing fiber optic plates and individual optical detectors can be 'tiled' together (i.e, joined) to form a single system. Such a system may be used, for example, during X-ray imaging, where it is often desirable to image objects having sizes larger than the area of a single optical detector. This may be preferable to using CCDs having pixel arrays of 512×512, 1024×1024, or greater, as these detectors feature optically active areas of only a few square centimeters. CCDs with larger detecting areas are often prohibitively expensive.

While this application can be used to generate low-cost, high-quality images, the interfaces separating neighboring CCDs (composed of, e.g., packaging materials surrounding the CCD's light-sensitive area) are optically inactive; imaging with these types of systems thus results in undesirable "seams" in the large-area image. These seams can have thicknesses as large as 50 microns or more, and can degrade image quality to the point where accurate detection of the object is impaired.

SUMMARY

In general, in one aspect, the invention provides a fiber optic plate featuring at least two sections containing multiple radiation-transmitting fibers, with at least one of the sections being curved or tapered, or angled with respect to another section. The plate additionally includes a groove extending partially into the plate for separating the first and second sections. The groove is positioned along the axial extension of the fibers and has a depth less than the thickness of the fiber optic plate. The groove can be straight, curved, or have a complex geometry, and can be adapted to the particular structure or configuration of the fiber optic plate. In a particular example, the groove can have a geometry which accounts for sheer distortion present in the fiber optic plate.

In preferred embodiments, the fiber optic plate is angled along the groove separating one section from another so that the first section is angled relative to the second section. Alternatively, the first section is tapered so that a top surface area of the first section is greater than a bottom surface area of the first section. In other embodiments, one of the plate's sections is curved. Typically, in all cases, the groove has a width of between 1 and 100 microns, and a depth of between 1 and 20 millimeters.

The fibers from the first and second regions are formed from materials such as glasses, plastics, polymers, dispersed scintillating materials, or single-crystal scintillating materials.

In another aspect, the invention provides an optical imaging system including at least two optical detectors, each containing an optically active region for generating light-induced images, and the above-described fiber optic plate. Each section of the plate is connected to a separate optical detector. Thus, fibers contained in the first and second sections deliver light exclusively to, respectively, the optically active regions of the first and second detectors. In this embodiment, fibers contained in the plate's first section are in direct contact with a first detector's optically active region, and fibers contained in a second section of the plate are in direct contact with a second detector's optically active region.

The optical imaging system can additionally include a scintillating material in contact with the fiber optic plate. In this case, the fibers contained in the first and second sections of the fiber optic plate are positioned to deliver light emitted from the scintillating material to the optically active regions of the detectors. The optical imaging system can also include a signal processor configured to combine the separate light-induced images from each detector to form the seamless image.

In another aspect, the invention provides a method for processing a fiber optic plate which includes the steps of first generating in the fiber optic plate one or more grooves to separate the plate into multiple sections, and then shaping a portion of a first section to be angled or curved relative to a portion of a second section. The shaping step includes heating the plate to a temperature so that a region of the plate (e.g., the groove or the fibers) is mechanically weakened, followed by applying a force to the weakened region to angle portions of the first and second sections relative to one another.

The groove can be formed by exposing the fiber optic plate to radiation, such as optical radiation emitted from a laser (e.g., an excimer laser or an optical parametric oscillator).

During the shaping step, the plate is partially bent along the groove so that the first and second sections are curved or bent, or angled relative to one another. In addition, this step may include inserting a bending tool into the groove to apply a force along the weakened portion.

The shaping step may also include heating portions of the second section, shaping portions of this section to be partially bent or curved, or angled with respect to the first section.

The invention has many advantages. In particular, the processing method can be used to fabricate fiber optic plates which produce seamless images. Such images are clearly desirable in applications ranging from X-ray imaging to LCD-type flat-panel or field-emission-type displays. In X-ray mammography, for example, seamless images allow detection of small lesions that otherwise cannot be viewed due to the presence of the seam.

In a more general sense, fiber optic plates featuring angled, individual light-channeling fibers allow illumination of small areas of the corresponding detector, resulting in increases in spatial resolution and detection efficiency. This allows generation of sharper images. In addition, these plates also permit use of lower levels of radiation during therapy, thereby increasing the safety of the procedure and reducing both the detector's and patient's exposure to potentially deleterious radiation.

In addition, because they can be composed of glass or other suitable materials, fiber optic plates can be made to include a scintillating material. Plates processed in this way can be fabricated to be more than a centimeter thick, thus increasing both the X-ray absorption cross section and the amount of X-ray-stimulated emission. This results in an additional increase in sensitivity of the fiber optic plate/detector system, thus further minimizing the patient's X-ray exposure. Moreover, combination of multiple small-area detectors results in a high-resolution detector having an effectively large area, and thus allows detection of relatively large-area images. Combination of detectors in this way can be advantageous to using a single, large-area detector, as these devices are relatively expensive and often have low spatial resolution.

Other advantages will be apparent from the following detailed description, and from the claims.

DETAILED DESCRIPTION

Figure 1A:
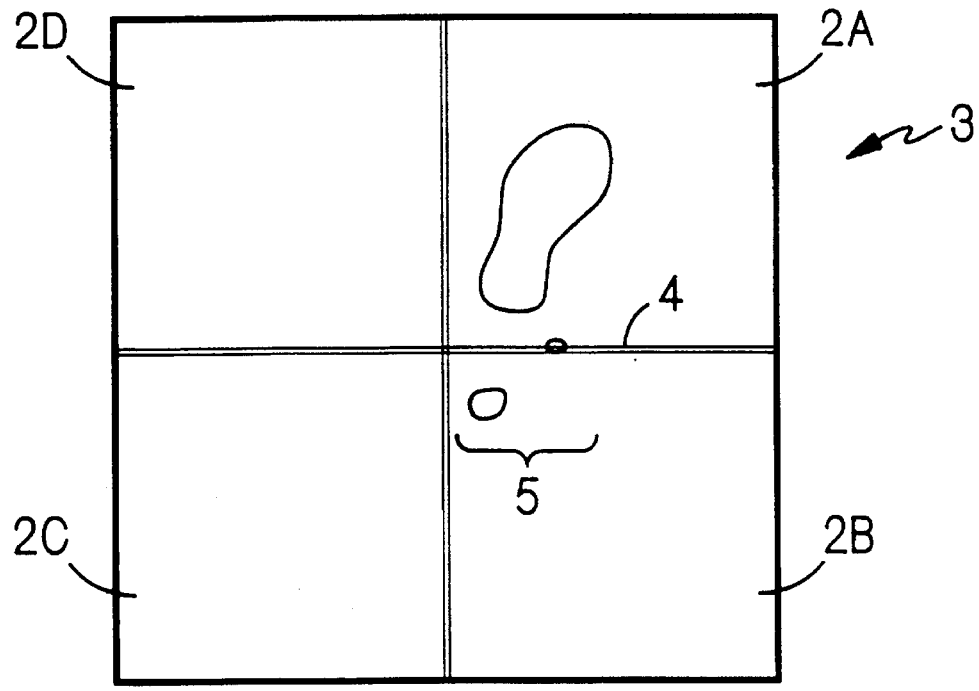
FIG. 1A is a schematic view of an image generated using fiber optic plates and imaging systems of the prior art.

Referring first to FIG. 1A, an optical imaging system of the prior art formed by tiling together multiple small-scale detectors is used to generate a large-scale image 3. Once combined, the small-scale detectors can be used to generate multiple sub-images 2A–2D which can be concatenated to form the large-scale image 3. In this case, the image 3 includes seams 4 resulting from interfacial "dead" regions where neighboring small-scale detectors are joined together. Such seams, of course, are undesirable, as they can obscure features 5 of the image, thereby affecting a viewer's analysis.

Figure 1B:
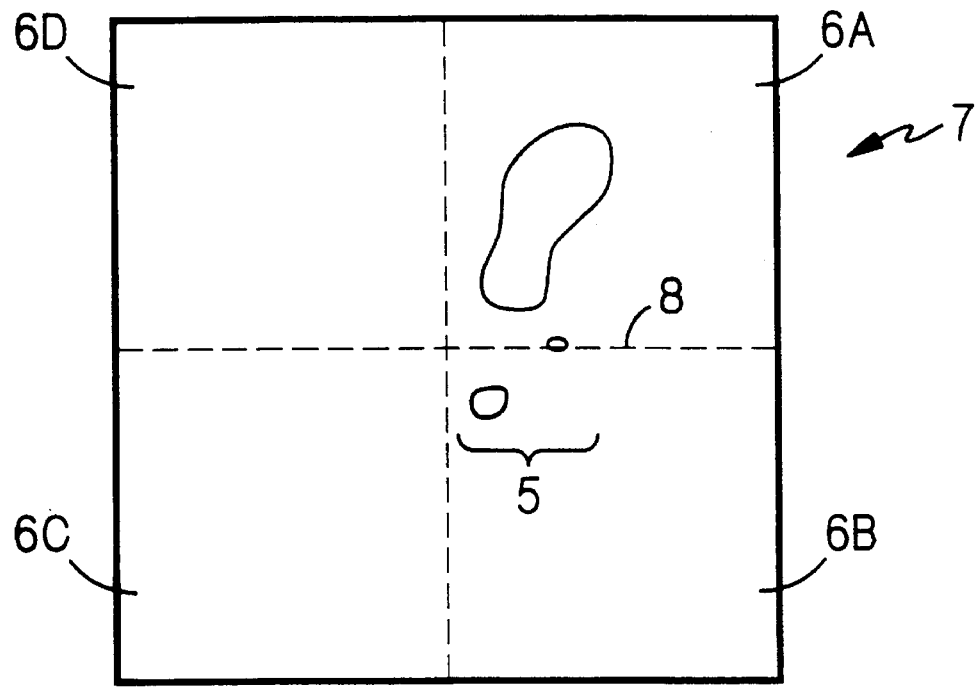
FIG. 1B is a schematic view of an image generated using fiber optic plates and optical imaging systems according to the invention.

A preferable image, obtained using the method of the present invention, is depicted in FIG. 1B. Here, sub-images 6A–6D are combined to form a large-scale, high-resolution image 7 which is free of seams and allows minimal obfuscation of the imaged object 5. Dotted lines 8 in the image indicate areas where the seams, present in the image of the prior art, have been eliminated. This method of imaging is particularly desirable when used in applications where image features can be small but extremely important for diagnosis, such as in X-ray mammography and other radiographic applications including cardiac, abdominal, extremity, and head imaging, and for fluoroscopic applications or dual-energy tissue densitometry.

Figure 2A:
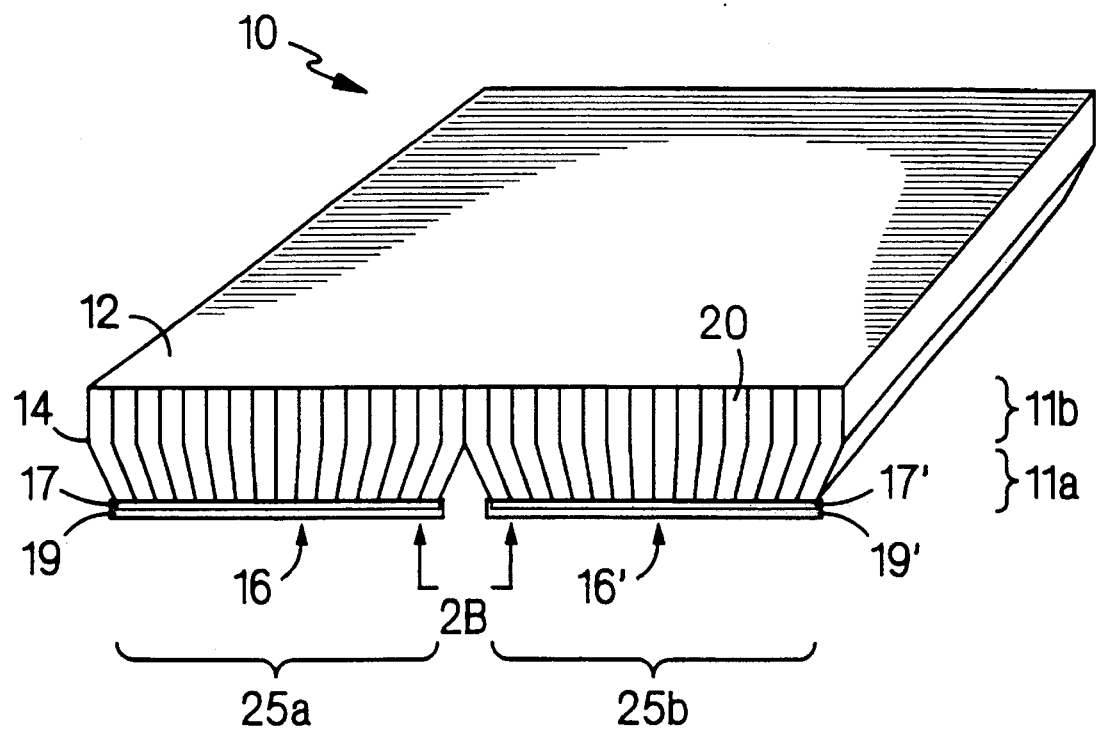
FIG. 2A is a plan view of a four-CCD imaging system containing a fiber optic plate with tapered optical fibers processed according to the invention.
Figure 2B:
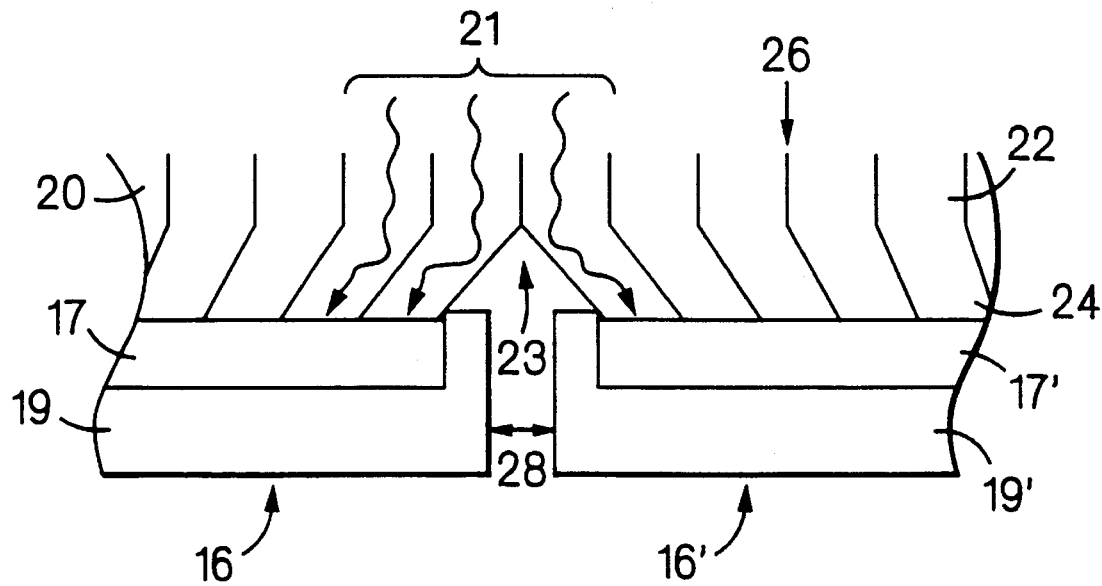
FIG. 2B is a cut-away expanded side view of an interfacial region in the imaging system of FIG. 2A.
Figure 3A:
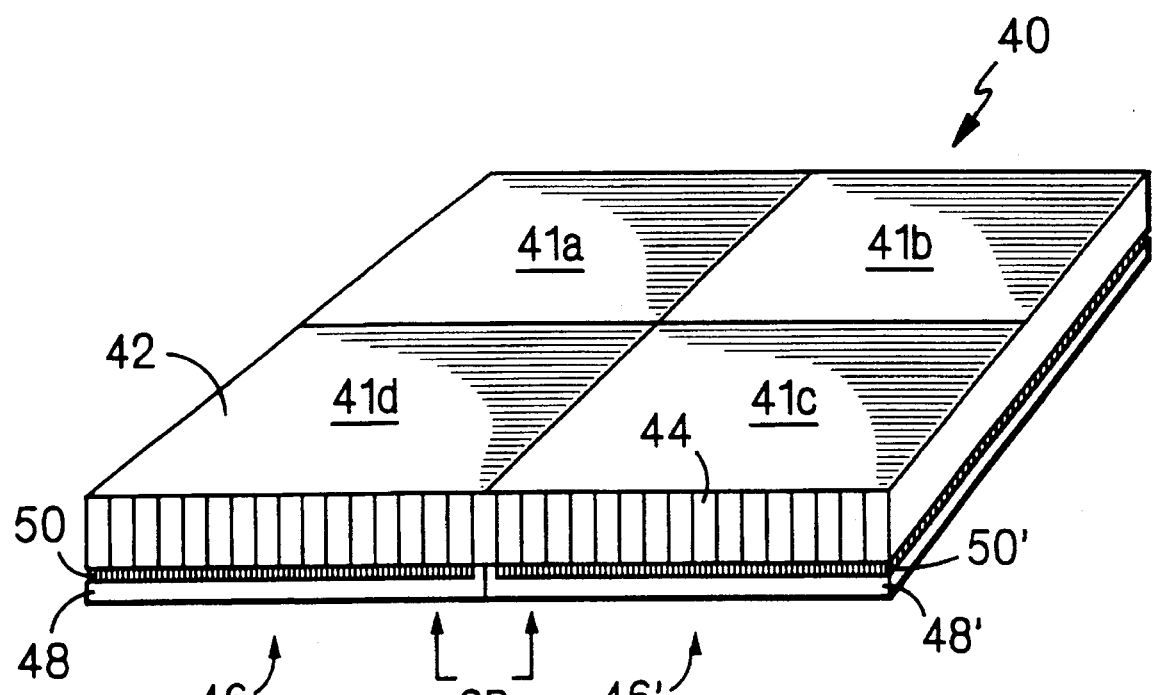
FIG. 3A is a plan view of a four-CCD imaging system containing a series of tiled fiber optic plates according to the prior art.
Figure 3B:
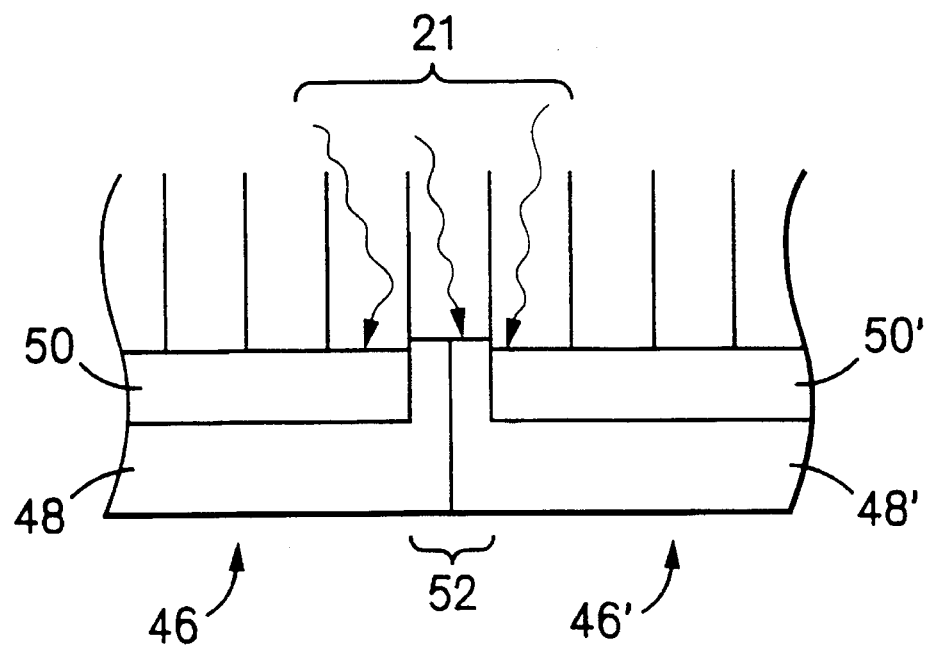
FIG. 3B is a cut-away expanded side view of an interfacial region in the imaging system of FIG. 3A.

Referring now to FIGS. 2A and 2B, seamless images such as that shown in FIG. 1B can be generated using an optical imaging system 10 including multiple detectors 16, 16' tiled together to effectively form a single, large-area detector. A fiber optic plate 14 having tapered fibers 20 is disposed between the detectors 16, 16' and a scintillating surface 12. The plate 14 is separated by a groove 23 into separate sections 25a, 25b; tapered fibers 20 contained in each section allow exposure of only the detector's optically active region 17. The groove 23 only extends partially into the fiber optic plate 14, and thus the plate's lower portion 11a is segmented, while its upper portion 11b is continuous.

The fiber optic plate 14 is sandwiched between a scintillating material 12 and the detectors 16, 16'. CCDs can be used as the detectors. In these devices, the optically active region 17 consists essentially of a silicon wafer pixelized into amorphous silicon diodes, each of which generates electrical signals following exposure to optical radiation. Typically, the CCD's optically active region is packaged using a surrounding housing 19, such as a metal case, which is optically inactive. Other optically inactive materials typically associated with packaging optoelectronic devices, such as polymer and dielectric materials, can also surround the optically active region.

The fiber optic plate is used to deliver radiation from the scintillating material to the detector, and can be composed of any material commonly used in the fiber optic arts. Most preferably, the plate features a network of glass or plastic-based fibers for channelling optical radiation. In all cases, the fiber-forming material is transparent to the optical wavelengths emitted by the scintillating material. In other embodiments, the scintillating material is incorporated directly into the material used as the fiber. In this case, the host material is most preferably plastic or glass-based, and can contain any of a number scintillating materials known in the art.

The tapered fibers allow irradiation (indicated in FIG. 2B by the arrows 21) of the plate's optically active region 17, and not the surrounding housing 19. This results in conversion of a large fraction of the incident optical radiation into an image-related signal. Individual fibers preferably have straight top portions 22 in contact with the scintillating material and tapered lower portions 24 in direct contact or in close proximity to the detectors 16, 16'. This allows light to be channeled from the scintillating material after propagating through each individual fiber. In order to efficiently channel light, individual fibers are tapered so that some fraction of optical radiation is internally reflected at the cladding/fiber interface 26 separating adjacent fibers. For a glass fiber having a refractive index of about 1.5, the taper angle is typically kept to between 5° and 25° so that a large amount of light is internally reflected.

The fibers 20 are tapered so that the optically active regions 17, 17' of neighboring detectors are irradiated, while the optically inactive housings 19, 19' (and other optically inactive materials) are not irradiated. Typically, the separation distance (indicated by the arrow 28 in FIG. 2B) between neighboring detectors is on the order of about 1–20 mm, and is most preferably less than about 5 mm.

Once detected, sub-images generated by each of the sections can be combined using simple computer algorithms well-known in the art. In general, each CCD generates a sub-image which is "pixelized," i.e., the sub-image contains a two-dimensional array of points according to the pixel array of the detector. Recombination can be accomplished by shifting the pixels of each sub-image by a predetermined number of pixels, and then adding the modified sub-images to form the complete image.

In contrast to the systems shown in FIGS. 2A and 2B, FIGS. 3A and 3B show optical imaging systems 40 of the prior art which generate images having undesirable seams. In these systems, detectors having effectively large areas are fabricated by tiling together multiple detectors 46, 46' and fiber optic plates 41a–41d. X-ray-induced radiation (indicated by the arrows 21) emitted from the scintillating material 42 is channeled through individual fibers, where it is detected by detectors 46, 46' joined in a side-by-side fashion. Also exposed is the interface 52 separating neighboring detectors. This region includes portions of adjacent optically inactive housings 48, 48' which surround the detectors' optical active regions 50, 50', and an adhesive material used to directly connect the detectors. During image formation, this configuration results in a fraction of the X-ray-induced optical photons irradiating an optically inactive region of the imaging system 40; these photons, therefore, are not detected. The resultant image is similar to that shown in FIG. 1A, i.e., it includes a series of seams which trace out the interfacial regions between the detectors.

Figure 4A:
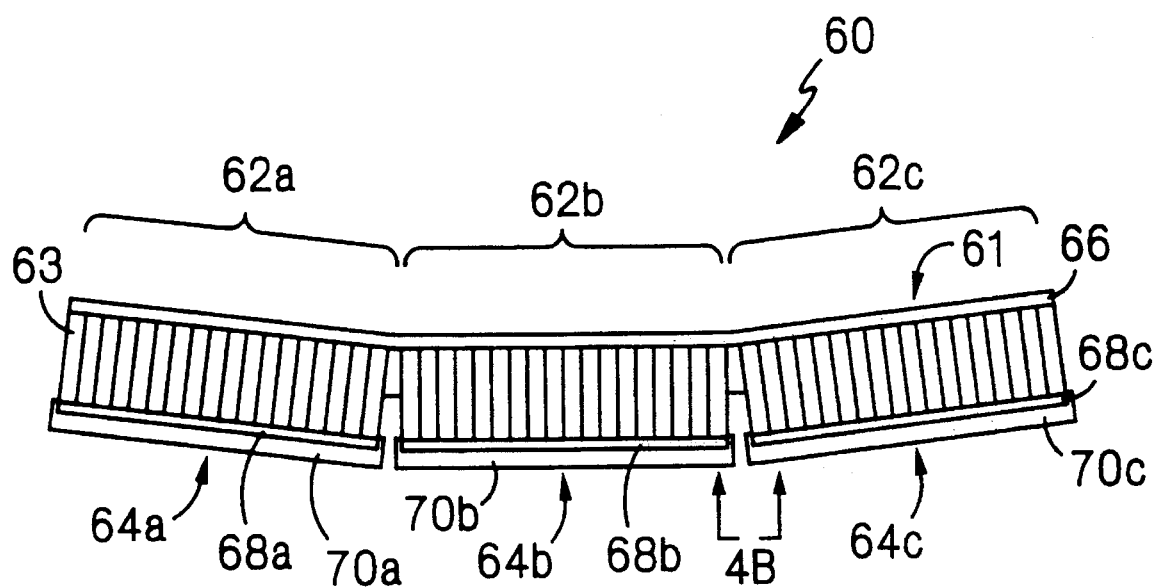
FIG. 4A is a side view of a three-CCD imaging system containing a fiber optic plate with angled optical fibers processed according to the invention.
Figure 4B:
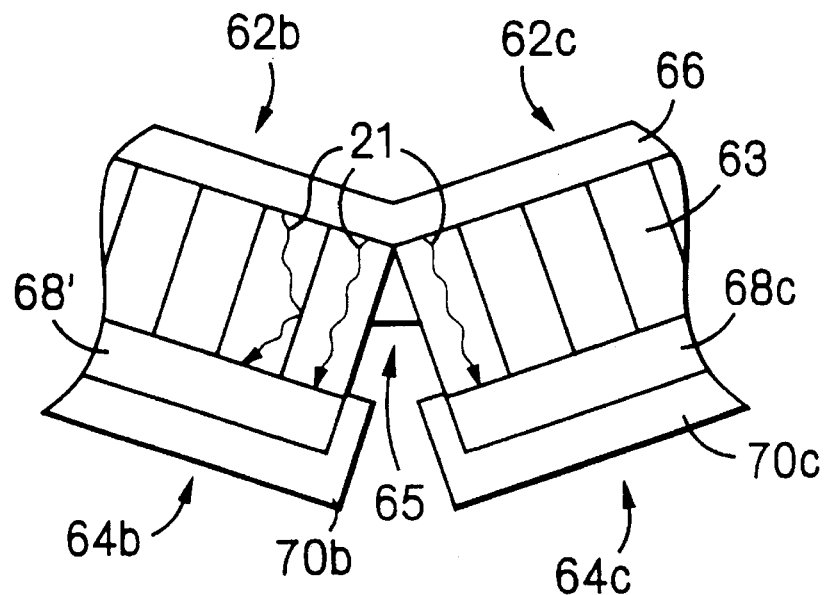
FIG. 4B is a cut-away expanded side view of an interfacial region in the imaging system of FIG. 4A.

Referring now to FIGS. 4A and 4B, in another embodiment of the invention, an optical imaging system 60 can include multiple sections 62a, 62b, 62c. In this case, each section contains individual fibers 63 which are straight and positioned roughly at right angles relative to the plane containing the scintillating material 66. Here, the sections are formed by bending the plate along a formed groove 65, and thus fibers contained in one section of the plate are collectively angled relative to those contained in adjacent sections. Separate sub-images are generated by attaching the sections of angled fibers to separate detectors 64a, 64b, 64c. In this way, optical radiation (indicated by the arrows 21) emitted following exposure of the scintillating material 66 to X-rays is channelled directly to the detectors' optically active regions 68a, 68b, 68c without irradiating the optically inactive housings 70a, 70b, 70c.

Positioning adjacent sections of the fiber optic plate at angles relative to one another allows multiple detectors to be placed in a side-by-side fashion. In this way, only the detectors' optically active regions are irradiated. Typically, for commercially available CCDs, the angular separation of adjacent sections is between about 5° and 25°. Angling of the plate's individual sections in this fashion results in a slight curvature in the top surface 61 of the imaging system. If such a curvature is undesirable, a portion of the fiber optic plate can be removed prior to applying the scintillating material 66. For example, a top portion of the plate can be ground and then polished to create a flat surface to which the scintillating material can be applied.

In the embodiment shown in FIG. 4A, the electronic signals from the detector can be processed so that the non-planar arrangement of the detectors is accounted for. In most cases, however, the angular separation between adjacent sections of the plate is small, and sub-images can be combined using simple algorithms.

Figure 5:
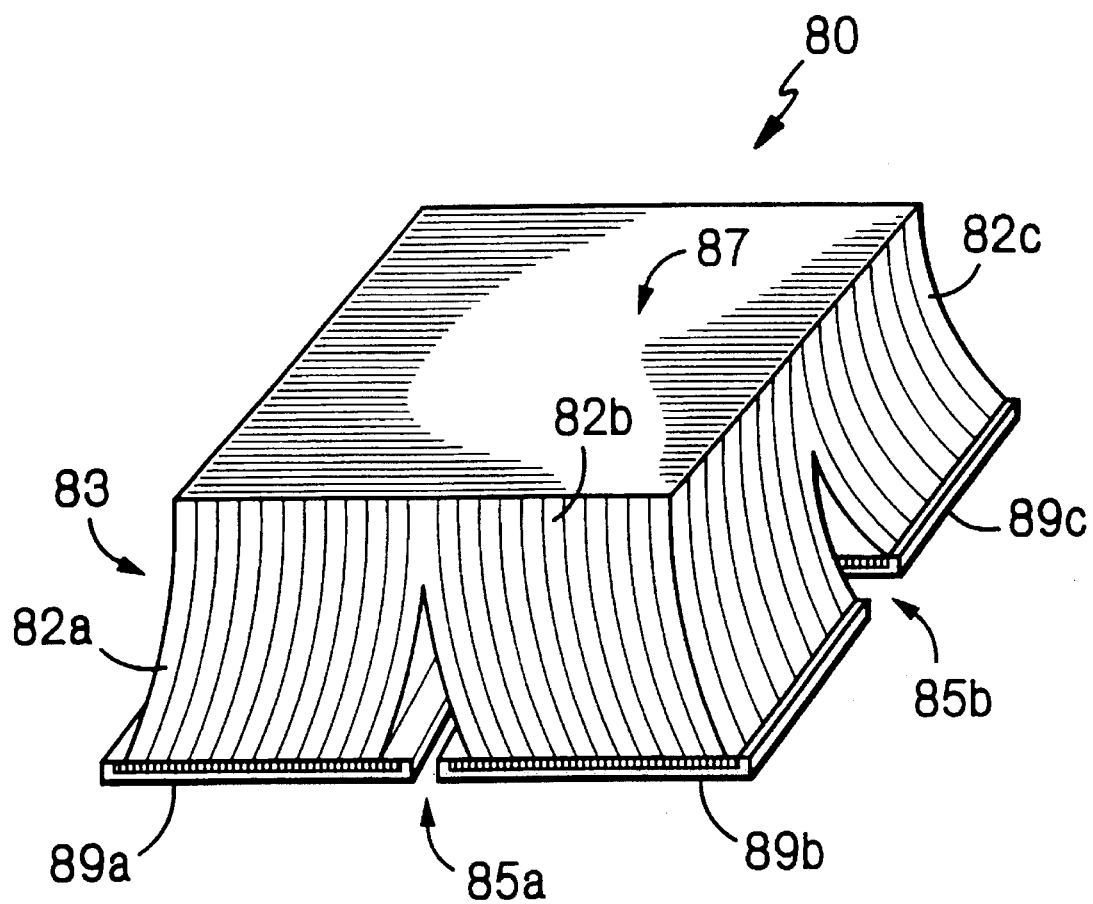
FIG. 5 is a three-dimensional view of an imaging system containing a fiber optic plate with curved optical fibers.

Referring to FIG. 5, in a related embodiment, an optical imaging system 80 contains multiple fiber-containing sections 82a, 82b, 82c. Each section is separated from the adjacent sections by grooves 85a, 85b extending partially into the fiber optic plate 83. Following formation of the grooves 85a, 85b, fibers contained in individual sections of the plate are pulled away from both the center portion of the plate and from fibers contained in adjacent sections. A scintillating material 87 is then deposited on the continuous (i.e., top) surface of the plate, and a series of spatially separated detectors 89a, 89b, 89c are connected to each section of the opposing (i.e., bottom) surface. Following this process, each section contains an array of curved fibers disposed to irradiate only the optically active regions of the connected detectors. During operation, in response to incident radiation, each detector generates a separate sub-image. As before, the sub-images are then combined with an image processor to generate a single, seamless image.

The optical imaging systems described herein can be used in any imaging application in which single or multiple fiber optic plates are normally used. In particular, these systems can be used during X-ray imaging applications, such as mammography. In this case, high-energy X-rays pass through an object to be imaged and then irradiate a scintillating layer of the detection system, where they are converted into multiple, lower-energy optical photons. For example, a film of gadolinium oxysulfide can be deposited on the fiber optic plate and used as the scintillating material. Following exposure to X-ray photons (having an energy of about 35 KeV) gadolinium oxysulfide emits multiple photons in the spectral region of 400–600 nm; typically, a single initial x-ray photons result in the generation of about 1000 optical photons. The emission process, therefore, effectively amplifies the number of photons available for detection, thereby allowing high-contrast images to be produced. The optical photons are emitted randomly and in all directions, and are channelled by the individual optical fibers in the plate to multiple pixels in the light-sensitive detector. Optical radiation incident on each pixel is converted into a series of electronic signals which are then recorded, digitized, processed, and used to form the image of the object.

With reference now to FIGS. 6A–6H, fabrication of the optical imaging systems described herein involves scribing a standard, commercially available fiber optic plate 70 (manufactured, e.g., by Schott Fiberoptics and Incom, both of Southbridge, Mass., and CHI, Inc. of Cambell, Calif.) to form a groove 72. Typically, the groove has a depth of between about 2 and 5 millimeters, although grooves deeper than 5 millimeters may also be formed. In general, the plate is scribed so that it is separated into multiple sections, with each section having an area approximately the same as that of the optically active region of the detector.

The plate 70 can be scribed using optical or mechanical means. For example, a laser light source can be focussed on a region in the fiber optic plate and used to ablate away a groove. Laser light can be focussed to relatively small spot sizes, thereby allowing thin grooves to be ablated. For example, optical beams are easily focussed to spot sizes of between 1 and 100 microns, and can be focussed down to sizes as small as a few microns.

In order to increase the peak optical power of the light source, laser pulses (as opposed to continuous wave radiation) can be used to scribe the fiber optic plate. Pulsed laser light is particularly advantageous for cutting channels having well-defined depths, as each pulse ablates away a known amount of material, and thus control over the groove depth can be easily achieved. In especially preferred embodiments, the source of the ablating electromagnetic radiation is an excimer laser, optical parametric oscillator, Nd:YAG or Nd:YLF laser (the fundamental or second harmonic frequencies can be used), $CO_2$ laser, or Ti:sapphire laser. In particularly preferred embodiments, an excimer laser having an optical output centered in the ultra-violet region (i.e., $\lambda$=190–260 nm) of the spectrum is used as the light source. The use of excimer and other lasers for processing materials is described in Patzel, "Once a Scientific Tool the Excimer Now Fills Many Roles", The Photonics Design and Applications Handbook, pages H288–H295 (1995), the contents of which are incorporated herein by reference.

Pulsed radiation can be generated by electro-optically or acousto-optically modulating the optical output of the light source, with the repetition rate and duration of the pulse being determined by a modulating device and the bandwidth of the modulated field. Typically, pulse durations of between 100 ps and 50 ns, and repetition rates of between 10 Hz and 10 kHz, can be easily achieved.

Additionally, the spatial mode quality of the laser beam after focussing will influence its ablating properties. Preferably, the spatial mode of the focussed beam is gaussian or nearly gaussian (i.e., the $TEM_{00}$ mode) and the spot size is diffraction limited.

In addition, masking techniques well known in the art can be used to tailor the ablating electromagnetic radiation pattern, thereby allowing precision micro-machining of the fiber optic plate. In particular embodiments, a mask (fabricated, e.g., from a reflecting material such as aluminum or gold) is placed in direct contact with the plate to be ablated; the pattern of the mask is then mapped onto the incident laser beam, allowing a particular pattern to ablated. Alternatively, a projection mask can be used in combination with the incident optical beam. In this embodiment, the mask is spatially separated from the substrate; the pattern of the mask is then mapped onto an incident optical field, which can then be focussed or expanded and used to ablate the substrate in the desired pattern.

Mechanical scribing can be performed using standard techniques known in the glass processing arts. The groove may be formed, for example, using a metal cutting tool having a thin, hardened cutting surface.

In still other embodiments, techniques other than laser ablation or mechanical cutting can be used to generate the groove. For example, chemical etching, lithographic techniques, electron beam processing, and heat-induced ablation can be used.

Figure 6:
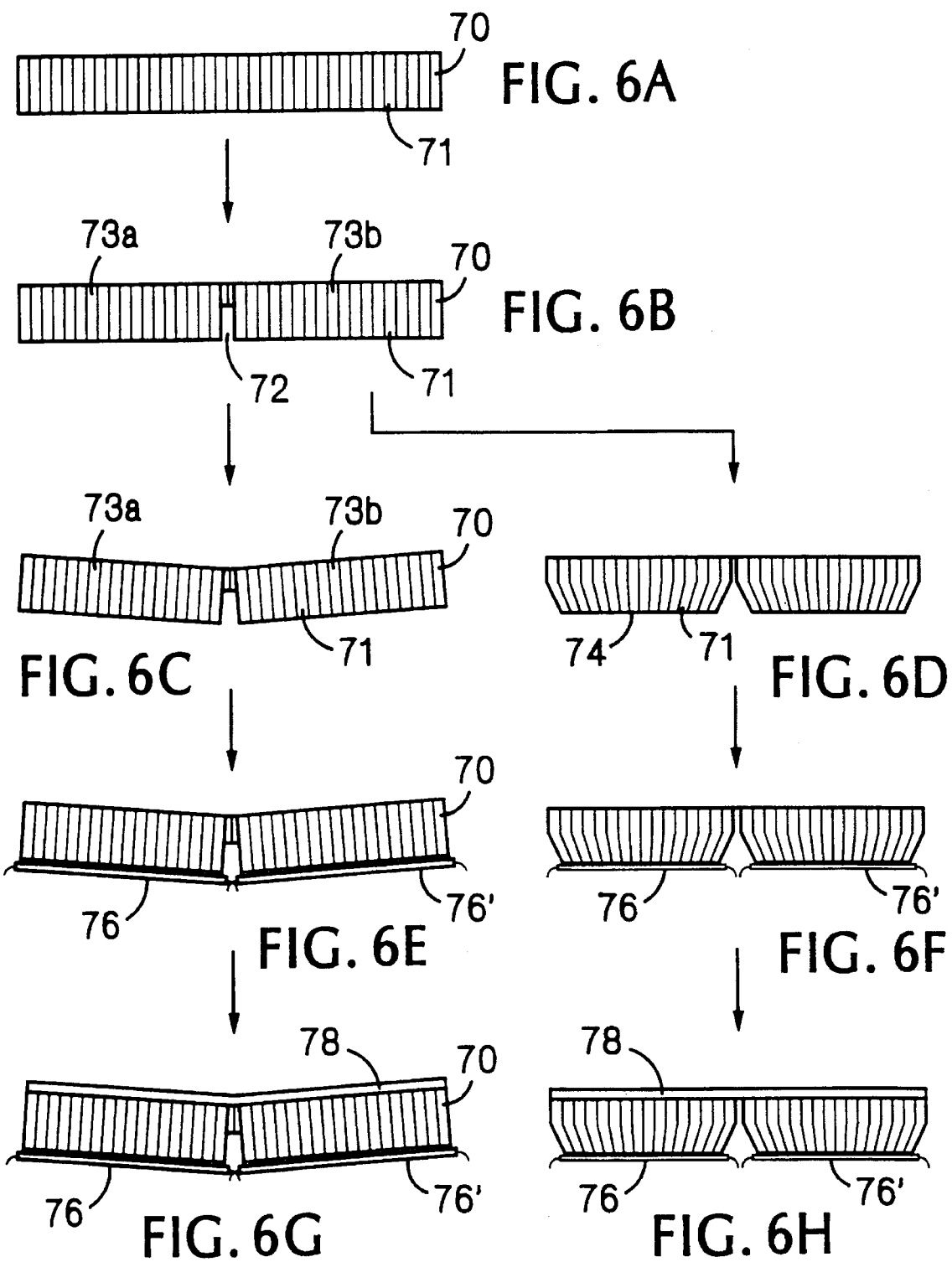
FIGS. 6A and 6B are, respectively, cross-sectional views of a fiber optic plate prior to and following irradiation with an ablating optical field.
FIGS. 6C, 6E, and 6G are, respectively, cross-sectional views of the angled fiber optic plate alone, including CCD detectors adhered to one surface, and including CCD detectors and a scintillating material adhered to opposing surfaces.
FIGS. 6D, 6F, and 6H are, respectively, cross-sectional views of a tapered fiber optic plate alone, including CCD detectors adhered to one surface, and including CCD detectors and a scintillating material adhered to opposing surfaces.

Referring now to FIGS. 6C and 6D, after formation of the groove, the plate is processed to allow an inward tapering of the fibers (as shown in FIG. 6D) or an angling of the adjacent sections of the plate (FIG. 6C). Alternatively, the fibers may be pulled so that they curve outward. Typically, this involves heating a region of the plate to a temperature which results in a softening (but not melting) of the fibers. The temperature required for softening will depend strongly on the composition of the fibers. For example, vitreous silica has a softening temperature of between about 500° C. and 750° C., whereas glasses containing metal or inorganic additives often have much lower softening temperatures. Materials other than glass, such as polymer-based fiber optic plates manufactured by Nanoptics (Gainseville, Fla.), have the advantage that they can become pliable at relatively low temperatures, thereby simplifying the processing method. Polyimides, for example, undergo significant weakening at about 200° C., and can thus be easily heated to their softening temperatures. A list of relevant thermal properties for a variety of optical fiber materials can be found in, for example, "The Handbook of Chemistry and Physics—66$^{th}$ Edition", pages B68–B161, (1985), the contents of which are incorporated herein by reference.

In general, heating and manipulation of the fiber optic plate is done using standard glass-shaping techniques known in the art, such as those described in "Techniques of Glass Manipulation in Scientific Research", Prentice Hall, Inc. (1946), the contents of which are incorporated herein by reference. More recent glass-shaping techniques are described in "Glass Technology—Developments since 1978", Noyes Data Corporation (1981), the contents of which are also incorporated herein by reference.

In general, during the shaping step of the processing method, the portion of the plate which is to be shaped (e.g., the scribed groove) is heated evenly to the softening temperature, with the actual heated area being several times larger than the area of the groove. In the case where the fibers are collectively tapered inward, the entire fiber optic plate can be heated to the softening temperature. During heating, the softened material should be supported. For the fiber optic plates shown in FIGS. 6A–6C, the supporting device can be bent to achieve the desired angle between the neighboring sections. A bending tool can additionally be used to angle the individual sections relative to each other (FIG. 6C), or to taper the fibers inward, in (FIG. 6D). In this latter case, following heating to the softening temperature, the bending tool is inserted in the scribed region, and pressure is applied to force the fibers inward to cause the taper. Once the desired position of the fibers is established, the plate is preferably cooled using a fluid, such as cold air or water, to cause the shaped material to harden. Here, care should be taken not to cool the fibers too quickly, as this can cause straining (and potentially cracking) in the heated regions.

In both cases, the tools used to shape the plates have thin edges (e.g., razor blades), as these edges must be able to fit within the scribed groove. In preferred embodiments, diamond or tungsten-coated razor blades are inserted in the groove and used to taper the individual sections of the fiber optic plate.

Inward tapering can result in a "bulging" of the fiber optic plate at the detector end 74. Once the plate has cooled, this defect can be easily corrected using standard methods of glass machining, grinding, or polishing to form an optically flat and transparent surface.

Once the fiber optic plate sections 73a, 73b are angled relative to each other, the grooves can be treated to enhance the optical and mechanical properties of the fiber optic plate. For example, the grooves can be filled with interstitial materials having lower relative refractive indices compared to the material used to form the fibers, thereby allowing reflection at the fiber/interstitial material interface. In other embodiments, a second optically inactive material, preferably one having a high absorption coefficient for visible light, can be used to fill the groove. The purpose of this material is to absorb scattered light, such as light coupled out of a particular fiber or reflected by the detection device, thereby allowing reduction in optical-based noise generated during an imaging procedure. Alternatively, epoxy or other plastic-based materials can be used to fill the groove in order to enhance the strength of the fiber optic plate.

Referring now to FIGS. 6E–6H, to function as an X-ray detector, the top and bottom portions of the processed fiber optic plate 70 are connected, respectively, to the optical detecting 76, 76' and scintillating 78 components. These devices are attached to the plate 70 using techniques known in the art. For example, the scintillating material can be deposited directly on the top portion of the fibers, as described in "Amorphosilicon Pixel Layers with CsI(Tl) Converters for Medical Radiography, Ging et al., published in the proceedings of the IEEE Nuclear Science Symposium (San Francisco, Calif.; 1993), the contents of which are incorporated herein by reference. Alternatively, as described above, the scintillating material can be incorporated directly into the material used in the fiber optic plate. The CCD can be attached to the fiber optic plate using known techniques in the art, such as with an optically transparent epoxy capable of transmiting the radiation emitted from the scintillating material.

Any scintillating material can be incorporated into or applied onto the surface of the fiber optic plate. Common scintillating materials include glass-based scintillators, CsI(Tl), $CdWO_4$, thallium-activated sodium iodide (e.g., NaI(Tl)), terbium-doped glass scintillators, transparent plastic scintillators, ceramic-based scintillators, including $Gd_2O_3$, $Gd_2O_2S$:Pr,Ce,X, where X is F or Cl, $Gd_2O_2S$:Pr, $Y_2O_3/Gd_2O_3$, and related ceramic-based materials. In other embodiments, the substrate is a single-crystalline scintillating material, such as $CdWO_4$. In still other embodiments, the fiber optic plate is formed using optical radiation to process a scintillating substrate. This method is described in the parent to this application, entitled "Structured Scintillating Screens", U.S. Ser. No. 08/287,239, filed Aug. 8, 1994, the contents of which have been previously incorporated herein by reference.

The detector used in combination with the structured scintillator is chosen depending on the particular imaging application. For example, electronic detection means are necessary for time-dependent imaging; CCD cameras, video cameras, one or two-dimensional diode arrays, charge injection devices, amorphous silicon detectors, position-sensitive detectors, photomultiplier tubes, and image intensifiers can produce high-resolution digital images when used in combination with the structured scintillator of the present invention. These devices, along with light-sensitive film, can also be used with the scintillator to produce static images.

Other Embodiments

Figure 7:
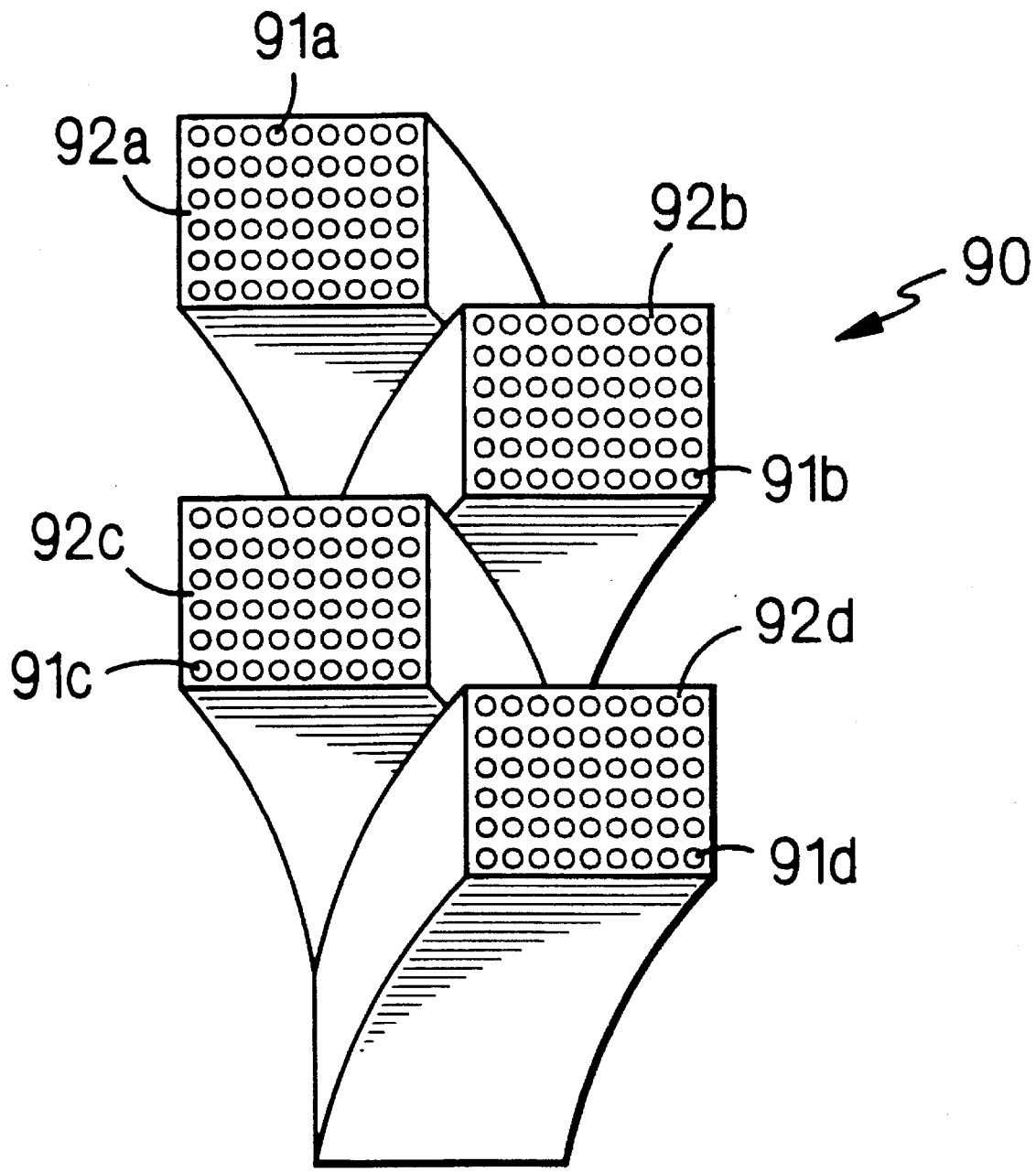
FIG. 7 is a three-dimensional view of a fiber optic plate processed according to the invention containing sections including curved optical fibers; and, FIG. 8 is a three-dimensional view of an imaging system, containing a fiber optic plate with curved optical fibers, in combination with a lens used to form an image.

Other embodiments are within the scope of the invention. For example, fiber optic plates having less conventional geometries can be processed according to the methods described herein and used to generate seamless images. With reference now to FIG. 7, a fiber optic plate 90 can be processed as described above so that it is scribed and divided into separate sections 92a–92d. Each section contains an array of fibers 91a–91d. These sections can be alternately bent to opposite sides of the plate, thereby allowing optically active regions of different detectors to be easily attached thereto. As before, the one requirement for these devices is that the processed fiber optic plate allow irradiation of the detectors' optically active regions while avoiding the optically inactive regions. Other geometries, such as circular or elliptical fiber optic plates having diverging sections, can also be manufactured using the techniques described above.

In addition, the processed fiber optic plates described herein have uses outside of the medical imaging arts. The plates can be used in any type of imaging, optical signal processing, or microscopy application. For instance, in the absence of a scintillating material, an imaging system containing a fiber optic plate can be used to direct an image to a detector.

Figure 8:
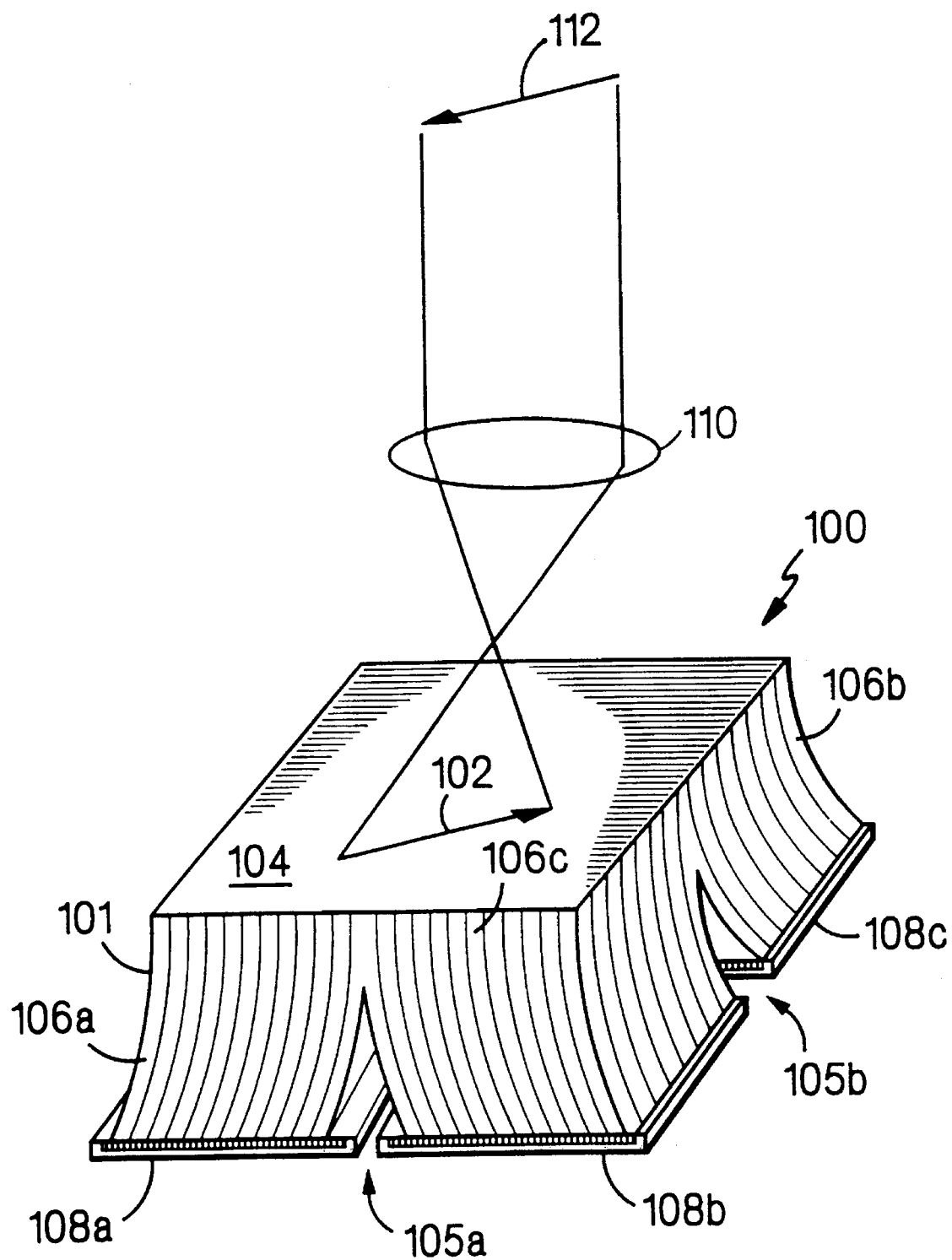

With reference now to FIG. 8, in a particular example, a fiber optic plate 100 is separated into multiple fiber-containing sections 106a, 106b, 106c. Each section is separated from the adjacent sections by grooves 105a, 105b extending partially into the fiber optic plate 100. Light from an object plane (indicated by the arrow 112) is focussed onto the plate's top surface 104 using a lens 110 to form an optical image (indicated in the figure by the arrow 102). Light from the image is coupled into fibers 101 contained in each section of the plate. These fibers then direct portions of the image to a series of connected detectors 108a, 108b, 108c for detection. As in other embodiments, each section of the plate contains an array of curved or angled fibers disposed to irradiate only the optically active regions of the detectors. During operation, in response to incident radiation, each detector generates a separate sub-image representative of a portion of the image formed by the lens on the plate's top surface. As before, the sub-images are then combined with an image processor to generate a single, seamless image of the object.

Still other embodiments are within the scope of the following claims.

What is claimed is:

1. A single, seamless fiber optic plate comprising:
   at least two sections, each comprising multiple radiation-transmitting fibers, wherein at least one of said sections is curved, tapered, or angled with respect to another section;
   a continuous, seamless top portion disposed above said sections; and
   a groove extending partially into said fiber optic plate for separating a first section from a second section, said groove being positioned along the axial extension of said fibers and having a depth less than a thickness of said fiber optic plate so that said top portion is continuous and seamless.

2. The fiber optic plate of claim 1, wherein said plate is angled along said groove separating one section from another.

3. The fiber optic plate of claim 1, wherein said first section is tapered so that a top surface area of said first section is greater than a bottom surface area of said first section.

4. The fiber optic plate of claim 1, wherein said first section is curved.

5. The fiber optic plate of claim 1, wherein said groove is formed by exposing said fiber optic plate to radiation.

6. The fiber optic plate of claim 5, wherein said radiation is optical radiation emitted from a laser.

7. The fiber optic plate of claim 6, wherein said laser is an excimer laser or an optical parametric oscillator.

8. The fiber optic plate of claim 1, wherein said groove has a width of between 1 and 100 microns.

9. The fiber optic plate of claim 1, wherein said groove has a depth of between 1 and 20 millimeters.

10. The fiber optic plate of claim 1, wherein said fibers in said first and second regions comprise glasses, plastics, polymers, dispersed scintillating materials, or single-crystal scintillating materials.

11. An optical imaging system comprising:
   at least two optical detectors, each comprising an optically active region for generating a light-induced image; and
   a single fiber optic plate comprising:
      at least two sections comprising multiple radiation-transmitting fibers, wherein at least one of said sections is curved, tapered, or angled with respect to another section;
      a continuous, seamless top portion disposed above said sections; and,
      a groove extending partially into said fiber optic plate for separating a first section from a second section, said groove being positioned along the axial extension of said fibers and having a depth less than a thickness of said fiber optic plate so that said top portion is continuous and seamless;
   wherein each of said sections is connected to an individual optical detector such that fibers contained in said first section deliver light exclusively to an optically active region of a first detector, and fibers contained in said second section deliver light exclusively to an optically active region of a second detector.

12. The optical imaging system of claim 11, wherein fibers contained in said first section of said fiber optic plate are in direct contact with a first detector's optically active region, and fibers contained in said second section of said fiber optic plate are in direct contact with a second detector's optically active region.

13. The optical imaging system of claim 11, wherein said fiber optic plate is angled along said groove separating one section from another so that said first section is angled relative to said second section.

14. The optical imaging system of claim 11, wherein said first section of said fiber optic plate is tapered so that a top surface area of said first section is greater than a bottom surface area of said first section.

15. The optical imaging system of claim 11, wherein said first section is curved.

16. The optical imaging system of claim 11, wherein said groove has a depth less than a thickness of said fiber optic plate.

17. The optical imaging system of claim 11, further comprising a scintillating material in contact with said fiber optic plate.

18. The optical imaging system of claim 17, wherein said fibers contained in said first and second sections of said fiber optic plate are positioned to deliver light emitted from said scintillating material to said optically active regions of said detectors.

19. The optical imaging system of claim 11, further comprising a signal processor configured to combine said separate light-induced images from each detector to form a seamless image.

20. A method for processing a fiber optic plate, said method comprising:
   generating in said fiber optic plate one or more grooves to separate said plate into a plurality of sections, each being in contact with a continuous, seamless top portion; and,
   shaping a portion of said first section to be curved, tapered, or angled relative to a portion of said second section, said shaping comprising heating said plate to a temperature wherein a region of said plate is mechanically weakened, followed by applying a force to said weakened region to angle said portion of said first section relative to said portion of said second section.

21. The method of claim 20, wherein during said generating, said groove is formed by exposing said fiber optic plate to radiation.

22. The method of claim 20, wherein said radiation is optical radiation emitted from a laser.

23. The method of claim 22, wherein said laser is an excimer laser or an optical parametric oscillator.

24. The method of claim 20, wherein said heated region comprises at least part of said groove.

25. The method of claim 24, wherein during said shaping, said plate is partially bent along said groove so that said first and second sections are angled relative to one another.

26. The method of claim 25, wherein said shaping further comprises inserting a bending tool into said groove to apply a force along said weakened portion.

27. The method of claim 20, wherein a portion of said first section is heated and weakened during said shaping step.

28. The method of claim 27, wherein portions of said fibers in said first section are partially bent or curved following said heating.

29. The method of claim 27, wherein said first section is tapered, with a top surface area of said first section being greater than a bottom surface area of said first section.

30. The method of claim 27, wherein said shaping further comprises shaping said second section to be partially bent or curved.

* * * * *